US012759437B2

(12) United States Patent
Sabo et al.

(10) Patent No.: US 12,759,437 B2
(45) Date of Patent: Oct. 13, 2026

(54) VEHICLE SEAT ADJUSTMENT ASSEMBLY

(71) Applicant: Brose Fahrzeugteile SE & Co. Kommanditgesellschaft, Coburg, Coburg (DE)

(72) Inventors: Sean Sabo, West Bloomfield, MI (US); Leo Ioppolo, Washington, MI (US); Ryan Adams, Auburn Hills, MI (US)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 316 days.

(21) Appl. No.: 18/600,998

(22) Filed: Mar. 11, 2024

(65) Prior Publication Data

US 2025/0282263 A1 Sep. 11, 2025

(51) Int. Cl.
*B60N 2/12* (2006.01)
*B60N 2/07* (2006.01)

(52) U.S. Cl.
CPC ........... *B60N 2/123* (2013.01); *B60N 2/0727* (2013.01)

(58) Field of Classification Search
CPC .............................. B60N 2/123; B60N 2/0727
See application file for complete search history.

(56) References Cited

U.S. PATENT DOCUMENTS 8,141,953 B2 3/2012 Quast et al.
2014/0353454 A1* 12/2014 Yamada ............... B60N 2/0715 248/429

FOREIGN PATENT DOCUMENTS

EP 2707249 B1 * 4/2016 ........... B60N 2/0875

OTHER PUBLICATIONS

Utzinger, Karl; EP-2707249-B1; Apr. 13, 2016; Description, machine translation (Year: 2016).*

* cited by examiner

*Primary Examiner* — David R Dunn
*Assistant Examiner* — Tania Abraham
(74) *Attorney, Agent, or Firm* — Dickinson Wright PLLC

(57) ABSTRACT

A memory bracket configured for use in a vehicle seat rail assembly. The rail assembly including a translatable rail provided with a first stop member and the memory bracket fixed to a fixed rail and including a second stop member. In response to the translatable rail being positioned in a use position, the first stop member contacts the second stop member, and as the translatable rail moves in the longitudinal direction from an ingress-egress position to the one or more use positions, a portion of the memory bracket engages and displaces a mechanical effector of an ingress-egress aid to permit the backrest to pivot away from the seating surface.

20 Claims, 10 Drawing Sheets

VEHICLE SEAT ADJUSTMENT ASSEMBLY

TECHNICAL FIELD

The present disclosure relates to a vehicle seat, in particular a longitudinal adjustment assembly for use in vehicle seats.

BACKGROUND

A known adjusting system for a vehicle seat is described in U.S. Pat. No. 8,141,953.

SUMMARY

According to one embodiment, a vehicle seat is provided. The vehicle seat may include a rail assembly, a seat sub-frame, a backrest, an ingress-egress aid, and a memory ramp. The rail assembly may include a fixed rail, a translatable rail, and a locking device. The locking device may be configured to operate in a locked state, in which the locking device locks the translatable rail to the fixed rail, and an unlocked state in which the locking device unlocks the translatable rail from the fixed rail to permit translation of the translatable rail along the fixed rail. The seat sub-frame may be fixed to the translatable rail and the backrest may be pivotally connected to the seat sub-frame. The backrest may be configured to pivot towards a seating surface of the seat sub-frame and the translatable rail may be configured to carry the seat sub-frame and the backrest. The ingress-egress aid is a mechanism that may be coupled to the backrest and the locking device and in response to the backrest pivoting towards the seating surface, the ingress-egress aid may be configured to change the locking device from the locked state to the unlocked state to collectively permit the translatable rail to move along the fixed rail in a first direction to an ingress-egress position. The memory ramp may be fixed to the fixed rail, and the ingress-egress aid may include a mechanical effector. As the translatable rail moves in a second direction, opposite the first direction, from the ingress-egress position to one or more use positions, the mechanical effector may be configured to move along the memory ramp in the second direction and in a vertical direction to permit the backrest to pivot away from the seating surface.

According to another embodiment, a rail assembly for use in a vehicle seat is provided. The vehicle seat may include a seat sub-frame, a backrest, and an ingress-egress aid. The backrest may be pivotally connected to the seat sub-frame and configured to pivot towards a seating surface of the seat sub-frame and the ingress-egress mechanism may be coupled to the backrest. The rail assembly may include a fixed rail, a translatable rail, a locking device, and a memory bracket. The translatable rail may include a first stop member and may be configured to carry the seat sub-frame. The locking device may be configured to be coupled to the ingress-egress mechanism and the locking device may be further configured to operate in a locked state, in which the locking device locks the translatable rail to the fixed rail, and an unlocked state in which the locking device unlocks the translatable rail from the fixed rail to permit translation of the translatable rail in a longitudinal direction and along the fixed between one or more use positions to an ingress-egress position. The ingress-egress mechanism may be configured to, responsive to the backrest moving towards the seating surface, change the locking device from the locked state to the unlocked state. The memory bracket may be fixed to the fixed rail and may include a second stop member. When the translatable rail is in a use position of the one or more use positions, the first stop member may contact the second stop member. As the translatable rail moves in the longitudinal position from the ingress-egress position to the one or more use positions, a portion of the memory bracket may engage and displace a mechanical effector of the ingress-egress mechanism to permit the backrest to pivot away from the seating surface.

According to yet another embodiment, a vehicle seat is provided. The vehicle seat may include a rail assembly, a seat sub-frame, a backrest, an ingress-egress mechanism, a memory bracket, and a second stop member. The rail assembly may include a fixed rail, a translatable rail, and a locking device. The translatable rail may include a first stop member, and the locking device may be configured to operate in a locked state, in which the locking device locks the translatable rail to the fixed rail and an unlocked state in which the locking device unlocks to the translatable rail from the fixed rail to permit translation of the translatable rail along the fixed rail. The seat sub-frame may be fixed to the translatable rail and the backrest may be pivotally connected to the seat sub-frame and configured to pivot towards a seating surface of the seat sub-frame. The translatable rail may be configured to carry the seat sub-frame and the backrest. The ingress-egress mechanism may be coupled to the backrest and the locking device, and in response to the backrest pivoting towards the seat surface, the ingress-egress mechanism may be configured to change the locking device from the locked state to the unlocked state to permit the translatable rail to move along the fixed rail in a first direction from one or more use positions to an ingress-egress position. The memory bracket may be fixed to the fixed rail and may form an inclined plane. As an example, the height of the inclined plane may increase with respect to a second direction, the second direction opposite the first direction. The second stop member may be coupled to the memory bracket and as the translatable rail is in a use position of the one or more use positions, the first stop member may contact the second stop member. The ingress-egress mechanism may include a mechanical effector. As the translatable rail moves in the second direction from the ingress-egress position to the one or more use positions, the inclined plane may be configured to engage the mechanical effector to permit the backrest to pivot away from the seating surface.

DETAILED DESCRIPTION

Figure 1:
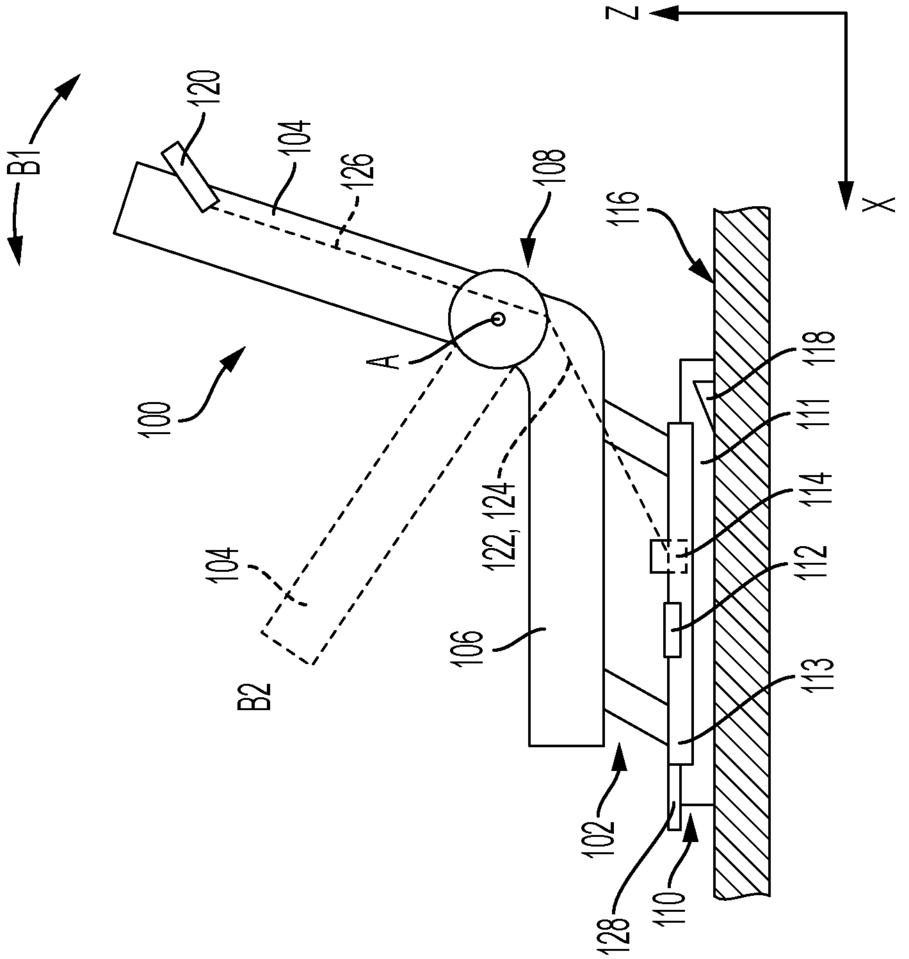
FIG. 1 illustrates a schematic diagram of an exemplary vehicle seat according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Certain vehicle seats, such as first row seats of a two door vehicle (e.g., coupe) and second or third row seats of a four door vehicle (e.g., cross-over, sport-utility vehicle) may include one or more easy-entry or ingress-egress mechanisms allowing the seat to be moved forward and downward (e.g., from a use position to a non-use position) and out of the way of a passenger entering (e.g., ingress) or exiting (e.g., egress) the vehicle. Once the passenger has entered or exited the vehicle, the passenger or another may move the seat back to the position (e.g., the use position), in which the seat was disposed prior to moving the seat. To enable relatively quick movement between the use and non-use positions, the vehicle seats are generally manually adjustable and require unlocking of a longitudinal adjustment assembly and the backrest prior to moving to the non-use position and the locking the same once in the use position.

To return from the non-use position to the use position, the user or passenger may push or pull on one or more portions of the seat so that the longitudinal adjustment assembly is actuated and returned to the use position. As the longitudinal adjustment systems is slid backwards, portions of the easy-entry or ingress-egress mechanisms may be triggered by a memory component (e.g., memory stone) disposed within the longitudinal adjustment assembly so that the backrest may return to the use position and portions of the longitudinal adjustment assembly may be stopped in the use position.

Under certain conditions, such as when a user or passenger slides the longitudinal adjustment assembly back to the use position with an excessive force, the memory component may break or become dislodged from its desired position. Breaking or dislodgement of the memory component may render the seat inoperable and cause customer dissatisfaction.

The present disclosure attempts to remedy the above-mentioned problems.

FIG. 1 illustrates a schematic view of an exemplary vehicle seat 100 according to one or more embodiments. The vehicle seat 100 may include a seat sub-frame 102 and a backrest 104 that may be pivotally connected to the seat sub-frame 102, via a pivot mechanism 108, so that the backrest 104 may pivot towards a seat surface 106 of the seat sub-frame 102, about an axis A from a use position B1 to an ingress-egress position B2, as represented by hidden lines 104. The vehicle seat 100 may include one or more rail assemblies 110 that may each include a fixed rail 111, a translatable rail 113, and a locking device 112 that may be configured to operate in a locked state, in which the translatable rail 113 is locked or fixed to the fixed rail 111, and an unlocked state in which the translatable rail 113 may translate in a longitudinal direction (e.g., as represented by the x-axis).

The vehicle seat 100 may further include an ingress-egress mechanism 114 that may be operatively coupled to the locking device 112 and the pivot mechanism 108 by one or more cables, such as an activation cable 122 and a communication cable 124. A known ingress-egress mechanism is described in U.S. Pat. No. 8,141,953 which is hereby incorporated by reference.

The pivot mechanism 108 may be operatively connected to a strap 120 by a backrest cable 126, so that as a user pulls the strap 120, the pivot mechanism 108 actuates to pivot the backrest 104 (e.g., as represented by the bi-directional arrows) towards the seating surface 106 and to unlock the locking device 112 so that the backrest 104 and the seat sub-frame 102 is movable (e.g., in a first or forward direction that is substantially parallel to the x-axis) to an ingress-egress position. When the seat 100 is in the ingress-egress position, the seat 100 may be positioned to provide additional space between the vehicle seat 100 and portions of a vehicle opening (e.g, B-pillar, C-pillar) or another vehicle seat (e.g., second row or third row).

The seat 100 may also include a release handle or lever 128 that may be operatively connected to the locking device 112, so that as a user applies a force to the handle 128 (e.g., a vertical force as represented by the z-axis) the locking device may change to the unlocked state. In one or more embodiments, the rail assembly 110 may include a memory bracket 118 that may be fixed to the fixed rail 111. When the translatable rail 113, which carries the seat sub-frame 102 and the backrest 104, is moved from the non-use position (e.g., in a second direction, opposite the first direction) one or more components of the ingress-egress mechanism 114 may engage and move along portions of the memory bracket 118 to permit the backrest 104 to move from the ingress-egress position B2 to the use position B1.

Figure 2B:
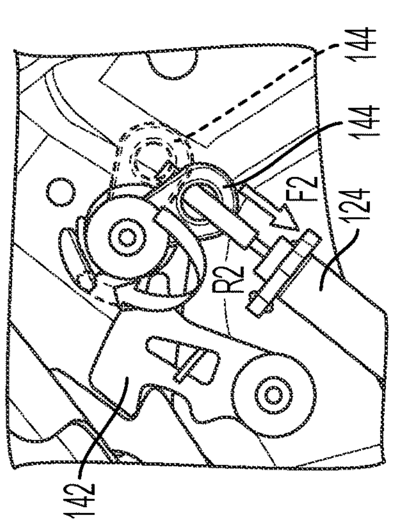
FIGS. 2A-2B illustrate side-detail views of a portion of a seat sub-frame of the vehicle seat shown in FIG. 2.
Figure 2A:
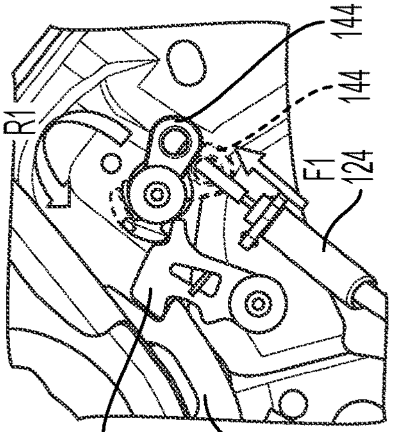
Figure 2:
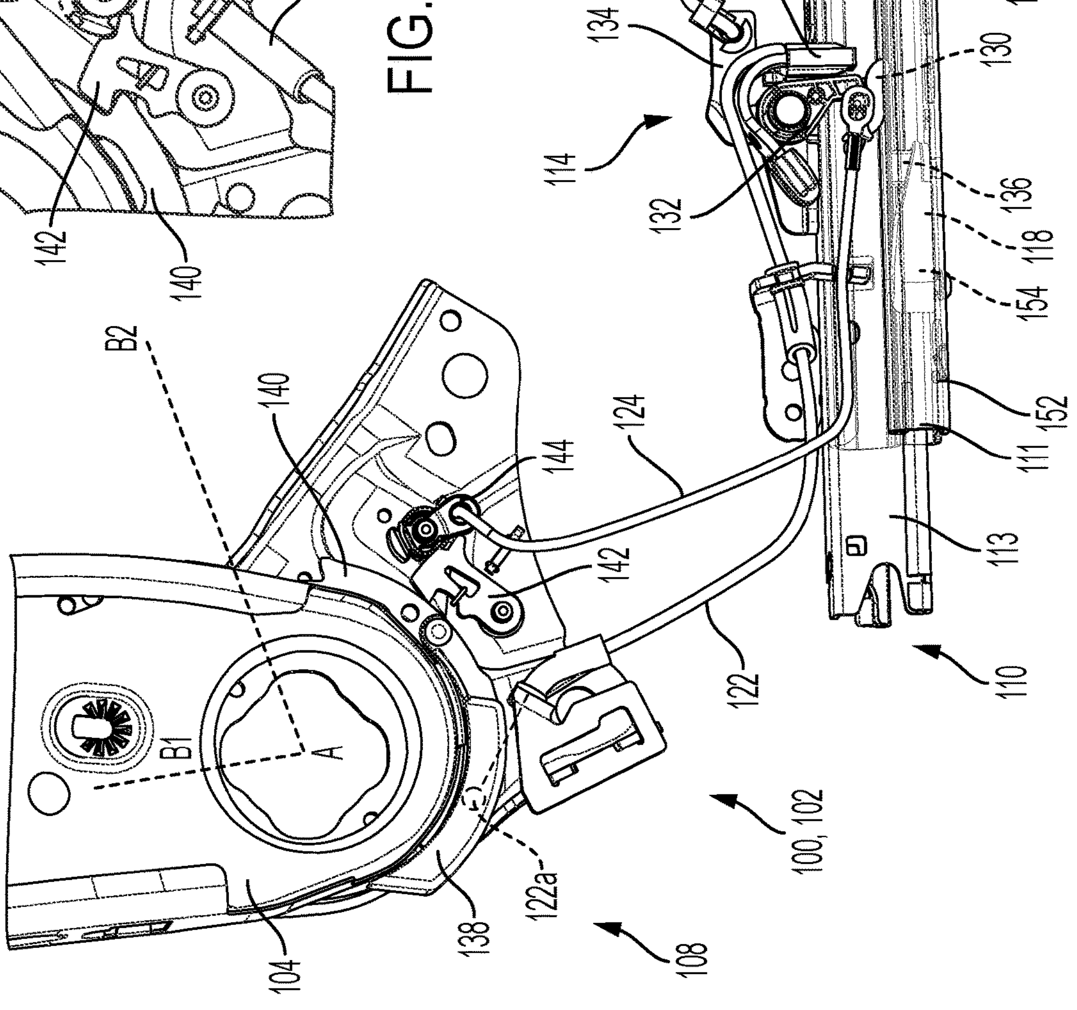
FIG. 2 illustrates a side view of a portion of a vehicle seat according to one or more embodiments.
Figure 3:
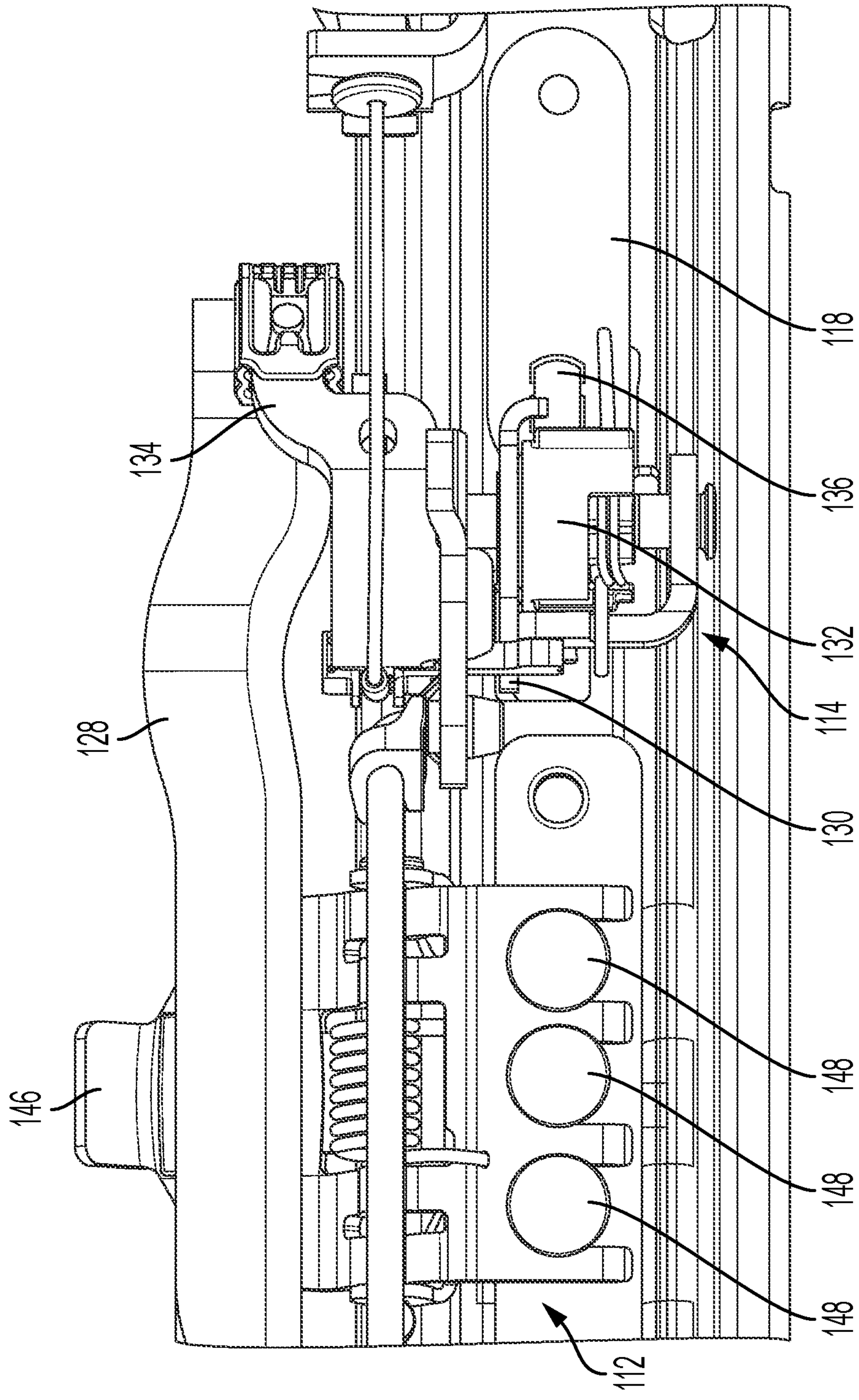
FIG. 3 illustrates a top view of a rail assembly and a portion of an ingress-egress mechanism according to one or more embodiments.
Figure 4:
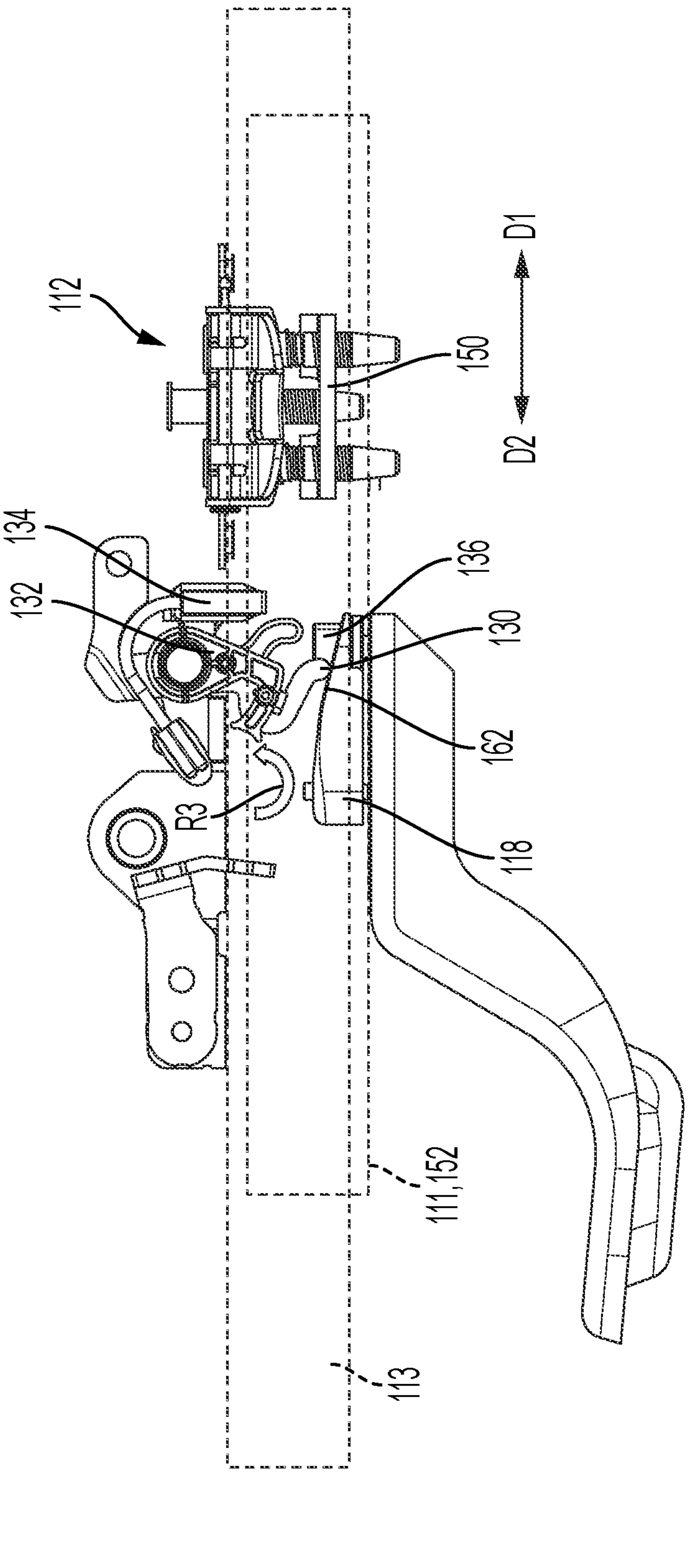
FIG. 4 illustrates a side view of a portion of the rail assembly shown in FIG. 3 in which a translatable rail is moving to one or more use positions.
Figure 5:
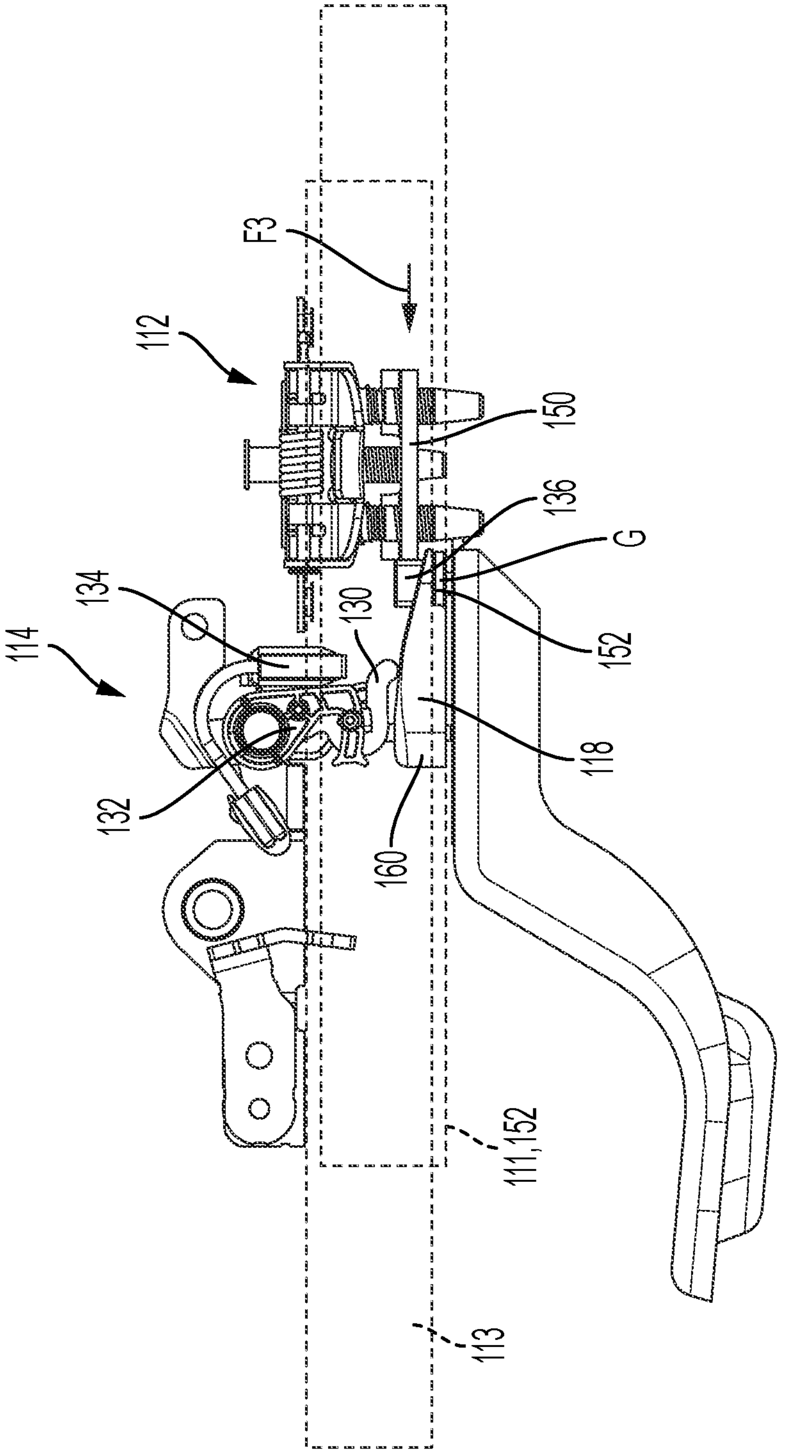
FIG. 5 illustrates a side view of the portion of the rail assembly shown in FIG. 4 in which the translatable rail is disposed in a use position, such as a full rear position.

FIG. 2 illustrates a side-perspective view of portions of the vehicle seat 100. For purposes of clarity, portions of the vehicle seat 100 are not shown, those portions include the seating surface 106, release handle or lever 128, and pivot mechanism 108, among other components. FIG. 3 illustrates a top view of a portion of a rail assembly 110, a portion of the release lever 128, and a portion of the ingress-egress mechanism 114. FIG. 4 illustrates a side view of the rail assembly 110 in which the translatable rail 113 is moving in the second direction towards one or more use positions. FIG. 5 illustrates a side view of the rail assembly 110 in which the translatable rail 113 is disposed in one or more of the use positions (e.g., a full rear position). For purposes of clarity, the fixed rail 111 and the translatable rail 113 are represented by hidden lines in FIG. 4 and FIG. 5, and a number of components shown and described in FIG. 2 are not shown.

As the backrest 104 pivots about the axis A from the use position B1 to the non-use position B2, a backrest actuation bracket 138 fixed to the backrest 104 may pivot with the backrest 104 to pull or actuate the activation cable 122. The activation cable 122 may include a first end **122*a* that may be fixed to the backrest actuation bracket 138 and a second end 122*b* that may be fixed or coupled to an activation lever 134 of the ingress-egress mechanism 114. An end of the activation lever 134 may engage an end of the release handle or lever 128 so that as the activation cable 122 is pulled by movement of the backrest actuation bracket 138, the activation lever 134 may pivot and displace the release handle 128. Pivoting of the release handle 128 may engage and rotate the locking lever 146 of the locking device 112, to lift the pins 148** and change the state of the locking device from the locked state to the unlocked state.

The seat sub-frame 102 may include one or more components configured to lock or latch the backrest 104 in the non-use position B2. As an example, a catch 142 may be configured to engage a backrest locking bracket 140 that may be fixed to the backrest 104, the backrest actuation bracket 138, or both. In one or more embodiments, a pawl 144 may be provided to prevent the catch 142 from disengaging the backrest locking bracket 140. The pawl 144 may be pivotally connected to one or more portions of the seat sub-frame 102 and operatively connected to the communication cable 124. As will be described in greater detail below, the catch 142, the pawl 144, and the locking bracket 140 may be collectively configured to prevent the backrest 104 from moving to the use position from the non-use position or ingress-egress position B2 until the translatable rail 113 has returned to one or more of the use positions (e.g., a full rear position).

A first end of the communication cable 124 may be fixed to the pawl 144 and a second end of the communication cable 124 may be operatively connected to one or more components of the ingress-egress mechanism 114 such as a mechanical effector or use position lever 130. As an example, the ingress-egress mechanism 114 may include a coupling lever 132 that is coupled to the use position lever 130 and the second end of the communication cable 124 may be fixed to the coupling lever 132. Additionally or alternatively, the coupling lever 132 may be biased by one or more springs so as the translatable rail 113 and backrest 104 move or are moved to the ingress-egress positions, a force F1 is applied by the communication cable 124 to rotate the pawl 144 to the engage the catch 142.

As the translatable rail 113 is moved in the second direction D2 towards the use position, the use position lever 130 may engage and directly contact one or more portions of the memory bracket 118 to move (e.g., rotate about rotational direction R3) the use position lever 130 in the second direction D2 (e.g., by way movement of the translatable rail 113) and the vertical direction (e.g., away from a bottom wall 152 of the fixed rail 111). Movement of the use position lever 130 may be transmitted through the coupling lever 132 and the communication cable 124 so that a second force F2 is applied to the pawl 144 thereby causing the pawl 144 to rotate (e.g., in the second rotational direction R2) away from the catch 142 and allowing the backrest 104 to return of the use position B1.

Figure 6B:
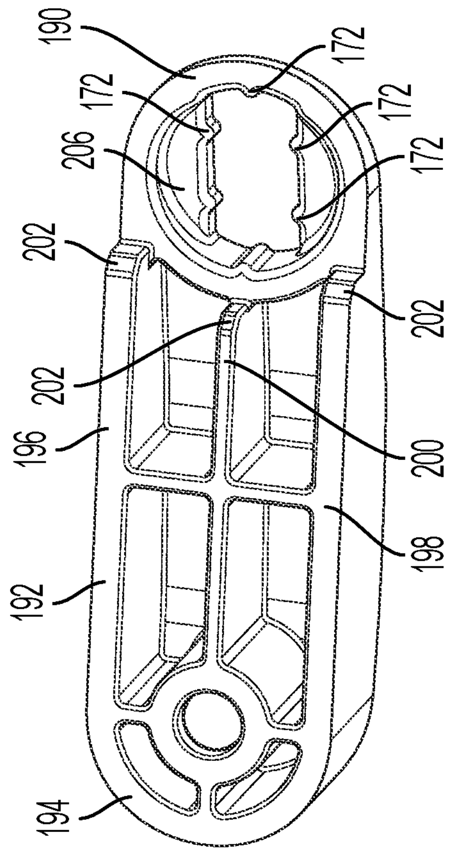
FIG. 6B illustrates a bottom-perspective view of a portion of a memory bracket according to one or more embodiments.
Figure 6A:
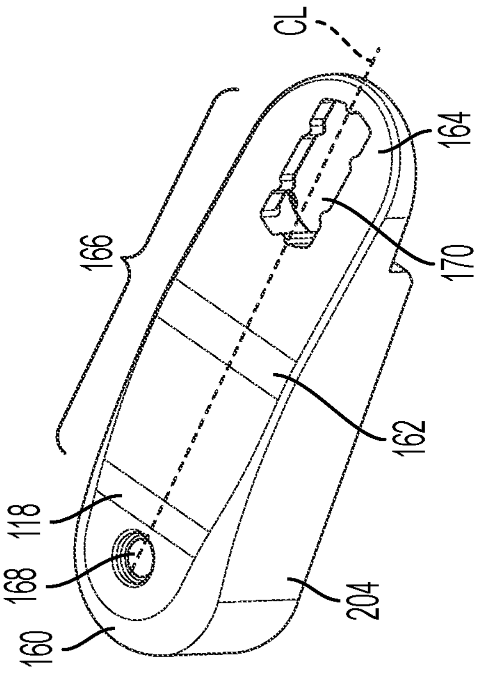
FIG. 6A illustrates a top-perspective view of a portion of a memory bracket according to one or more embodiments.

FIG. 6A and FIG. 6B show a top-perspective view and a bottom-perspective view, respectively of the memory bracket 118 according to one or more embodiments. The memory bracket 118 may be positioned to engage the use position lever 130 as the translatable rail 111 moves from the ingress-egress position to the use position. In one or more embodiments, a first stop member 150 such as a locking device bracket may be fixed to the translatable rail 113 so that when the translatable rail 113 is disposed in one or more of the use positions (e.g., full rear), the first stop member 150 directly contacts a second stop member 136 (FIG. 5) that may be fixed to one or more portions of the fixed rail 111.

As an example, the second stop member 136 may be coupled to the memory bracket 118 or be integrally formed with the memory bracket 118.

In one or more embodiments, the second stop member 136 may be formed by a fastener (e.g., a rivet) provided with a shaft or shank 156 that may extend through the bottom wall 152 of the fixed rail 111. The second stop member 136 may also include a collar 154 and a stop post 158, the collar 154 may be disposed between the stop post 158 and the shank 156. The stop post 158 may shaped, positioned, and/or sized so that as the mechanical effector or the use position lever 130 moves along portions of the memory bracket 118, neither the use position lever 130 nor any other portion of the ingress-egress mechanism contacts the stop post 158 or any other portion of the second stop member 136.

Figure 7:
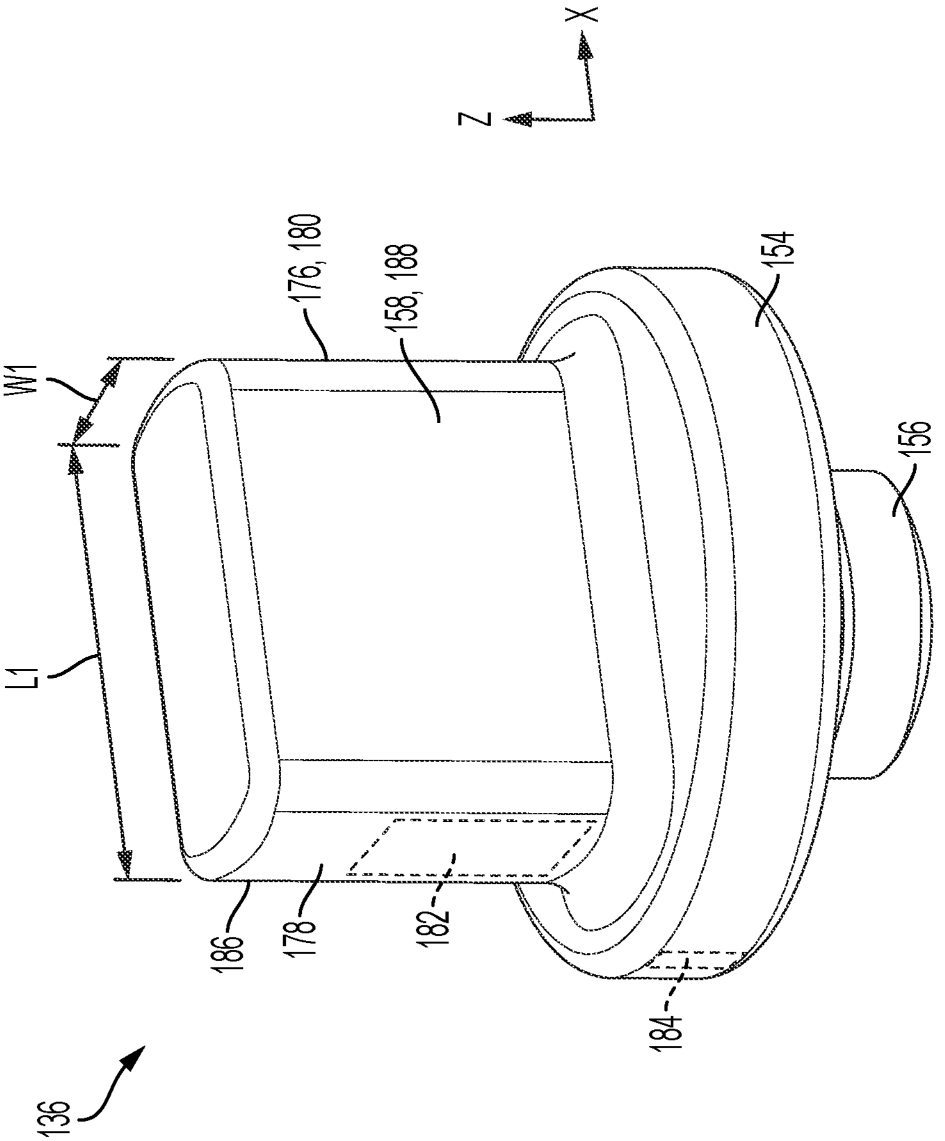
FIG. 7 illustrates a perspective view of a stop member according to one or more embodiments.

As illustrated in FIG. 7, the stop post 158 may have a substantially cylindrical body (e.g., rectangular) shape and the second stop member 136 may include a front side or first side 176, a rear side or second side 178, and third and fourth sides 186, 188 or transverse sides extending between the first side 186 and the second side 188. As an example, the first side or front side 176 may face in the first direction D1 and the second side 178 or rear side may face in the second direction D2, and the first and second sides 176, 178 may have a first width W1. The lateral sides or third and fourth sides 186, 188 may have a first length L2 that may be greater than the first width W1.

The first side 176 may include a first surface 180 that is positioned to engage the first stop member or stop bracket 150 when the translatable rail 113 is in one or more of the use positions (e.g., full rear, as illustrated in FIG. 5) and the second side 178 may include a second surface 182 and a third surface 184 that may be spaced apart from one another with respect to the vertical direction (e.g., as represented by the z-axis). The second surface 182 and the third surface 184 may be configured to engage portions of the memory bracket 118 so that load applied from the first stop member or stop bracket 150 sliding into the second stop member or end stop 136 is transferred and at least partially dissipated by and through the end stop 136, through the memory bracket 118, and into the fastener 174.

The memory bracket 118 may include a rear portion 160, a front portion 164, and a medial or effective portion 162 that is disposed between the front and rear portions 160, 164. The effective portion 162 may be the portion that engages the mechanical effector or use position lever 130 so that the use position lever 130 is actuated (FIG. 4) to permit the backrest 104 to move from the non-use position to the use position. The memory bracket 118 may taper in the vertical direction from the rear portion 160 to the front portion 164 to form an inclined plane 166 extending from the rear portion 160 to the front portion 164. The rear portion 160 of the memory bracket 118 may define one or more fastener apertures 168 that may be configured to receive a fastener 174 that may extend through the bottom wall 152 of the fixed rail 111 to fix the rear portion 160 of the memory bracket 118 to the fixed rail 111.

The front portion 164 may define a stop member aperture 170 configured to receive portions (e.g., the stop post 158 of the second stop member 136) so that the stop post 158 extends through the stop member aperture 170. The stop member aperture 170 may have an elongated shape and be disposed along a center CL of the memory bracket 118. The fastener aperture 168 may be disposed along the center CL of the memory bracket 118 so that forces applied to the second end stop member 136 may be transmitted in a relatively straight direction towards the fastener 174. An inner periphery of the stop member aperture 170 may include one or more locking protrusions 172 that extend into the aperture and engage the stop post 158 to form a force-fit or press-fit condition between the memory bracket 118 and the stop post 158. In one or more embodiments, lateral sections 206 of the front portion 164 that define the stop member aperture 170 may be recessed with respect to the bottom portion 190 to form a pocket, so that portions of the collar 154 nest within the pocket and abut against the lateral sections 206. The pocket and lateral sections 206 may facilitate positioning the second stop member 136 with respect to the memory bracket 118 during assembly and may also facilitate load distribution when the translatable rail 113 and first stop member 150 slide into the second stop member 136.

A bottom surface 190 of the front portion 164 may be offset with respect to a bottom surface 192 of the effective or medial portion 162 and/or a bottom surface 194 of the rear portion 160 so that the bottom surface 190 of the front portion 164 is spaced apart from the bottom wall 152 to form a gap G and the collar 154 may be disposed within the gap G. Because the collar 154 is disposed within the gap G, the third surface 184 may transfer the force F3 to a bottom portion of the memory bracket 118 in addition to the force transferred by the second surface 182.

The bottom surfaces 190, 192, 194 may collectively form a portion of a base 204 of the memory bracket 118, and the base 204 may include one or more arms including a first arm 196, a second arm 198, and a medial arm 200. The first and second arms 196, 198 may each extend along first and second edge regions and each of the arms 196, 198, 200 may include distal end portions 202. The distal end portion 202 of the medial arm 200 may be configured to engage the third surface 184 of the collar 154 and the distal end portions 202 of the first and second arms 196, 198 may engage other surfaces of the collar 154 to rotationally fix the memory bracket 118 to the bottom wall 152 of the fixed rail 111.

Figure 8:
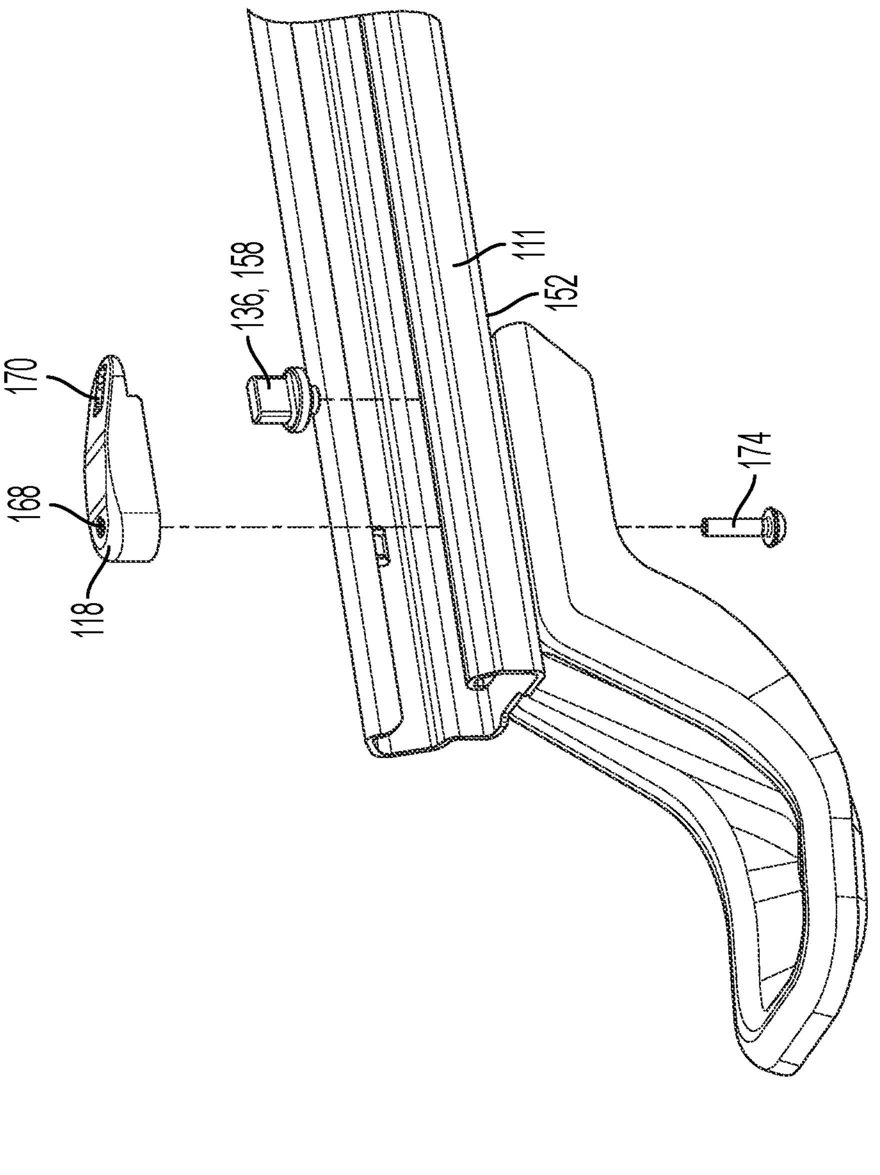
FIG. 8 illustrates an exploded-perspective view of a fixed rail, the memory bracket and the stop member illustrated in FIG. 7 and FIG. 6B, respectively.
Figure 10:
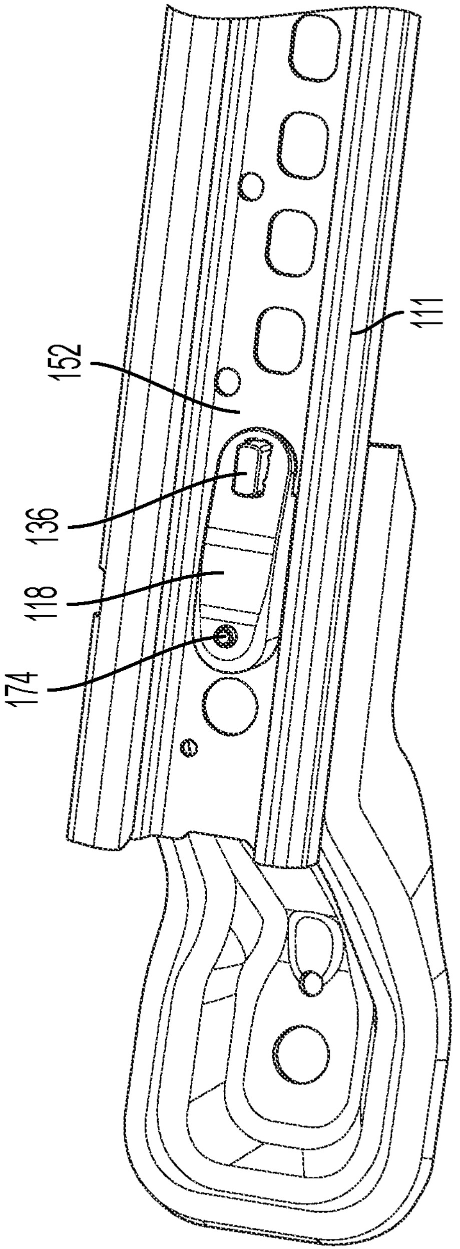
FIG. 10 illustrates a perspective view of the fixed rail, the memory bracket, and the stop member illustrated in FIG. 8.

FIG. 8 illustrates an exploded view of the memory bracket 118, second stop member 136, and the fastener 174 being assembled to the fixed rail 111. FIG. 10 illustrates the memory bracket 118, second stop member 136, and the fastener 174 assembled to the fixed rail 111. During assembly, the second stop member 136 (e.g., the shank 156 shown in FIG. 7) may be inserted into an aperture defined by the bottom wall 152 of the fixed rail. The memory bracket 118 may be positioned and placed upon the bottom wall 152 so that the stop post 158 extends through the stop member aperture 170 and the fastener 174 may be inserted from and through the bottom wall 152 of the fixed rail 111 and into the fastener aperture 168.

Figure 9:
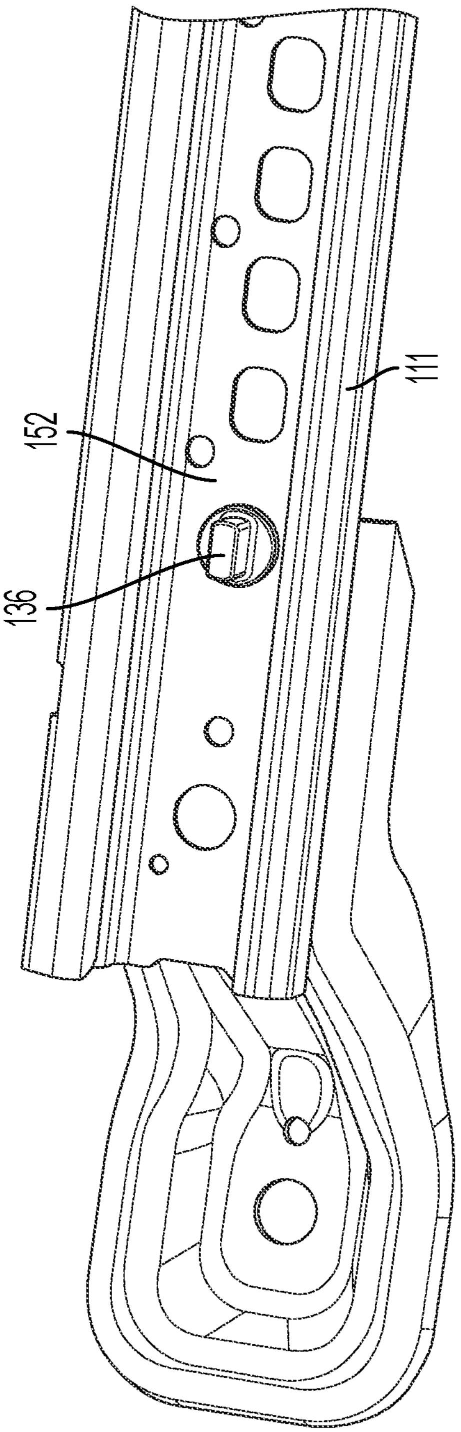
FIG. 9 illustrates a perspective view of a fixed rail and the stop member illustrated in FIG. 7 and FIG. 6B, respectively

FIG. 9 illustrates a top-perspective view of the second stop member 136 fixed or installed to the fixed rail 111. Under certain circumstances, such as when vehicle seat does not include an ingress-egress mechanism 114, the second stop member 136 may be used without the memory bracket. In this configuration, the collar 154 may lie along the bottom wall of the fixed rail.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

100 vehicle seat
102 seat sub-frame
104 backrest
106 seating surface
108 pivot mechanism
110 rail assembly
111 fixed rail
112 locking device
113 translatable rail
114 ingress-egress mechanism
116 vehicle floor
118 memory bracket
120 strap
122 activation cable
122*a* first end of activation cable
122*b* second end of activation cable
124 communication cable
126 backrest cable
128 release handle and lever
130 effector, use position lever
132 effector, coupling lever
134 activation lever
136 second stop member, end stop
138 backrest actuation bracket
140 backrest locking bracket
142 catch
144 pawl
146 locking lever
148 pins
150 stop bracket
152 bottom wall of fixed rail
154 collar of second stop member
156 shank of second stop member
158 stop post
160 rear portion
162 effective portion
164 front portion
166 inclined plane
168 fastener aperture
170 stop member aperture
172 locking protrusion
174 fastener
176 first side, front side
178 second side, rear side
180 first surface
182 second surface
184 third surface
186 third side, lateral side
188 fourth side, lateral side
190 bottom surface front portion
192 bottom portion effective portion
194 bottom portion rear portion
196 first arm, edge region
198 second arm, edge region
200 third arm, medial region
202 distal end portions
204 base memory bracket
206 recessed surface

What is claimed is:

1. A vehicle seat comprising:

a rail assembly including a fixed rail, a translatable rail, and a locking device, the locking device configured to operate in a locked state in which the locking device locks the translatable rail to the fixed rail, and an unlocked state, in which the locking device unlocks the translatable rail from the fixed rail to permit translation of the translatable rail along the fixed rail;

a seat sub-frame fixed to the translatable rail;

a backrest pivotally connected to the seat sub-frame and configured to pivot towards a seating surface of the seat sub-frame, wherein the translatable rail is configured to carry the seat sub-frame;

an ingress-egress aid coupled to the backrest and the locking device, wherein in response to the backrest pivoting towards the seat surface, the ingress-egress aid is configured to change the locking device from the locked state to the unlocked state to collectively permit the translatable rail to move along the fixed rail in a first direction to an ingress-egress position; and a memory ramp fixed to the fixed rail, wherein the ingress-egress aid includes a mechanical effector, wherein as the translatable rail moves in a second direction from the ingress-egress position to one or more use positions, the mechanical effector moves along the memory ramp in the second direction and a vertical direction to permit the backrest to pivot away from the seating surface, and wherein the second direction is substantially opposite to the first direction.

2. The vehicle seat of claim 1, further comprising:

a stop bracket coupled to and configured to translate with the translatable rail; and an end stop extending through a portion of the memory ramp and fixed to the fixed rail, wherein the one or more use positions includes a full rear position, in which the stop bracket directly contacts the end stop.

3. The vehicle seat of claim 2, wherein the stop bracket does not engage the memory ramp.

4. The vehicle seat of claim 1, further comprising:

a stop bracket coupled to and configured to translate with the translatable rail; and an end stop, wherein the one or more use positions includes a full rear position, in which the stop bracket directly contacts the end stop, wherein the memory ramp includes a rear portion, a front portion, and an effective portion extending between the rear portion and the front portion, wherein the mechanical effector is configured to engage the effective portion to permit the backrest to pivot away from the seating surface, and wherein the end stop extends through the front portion and is fixed to the fixed rail.

5. The vehicle seat of claim 4, further comprising:

a fastener, wherein the rear portion defines an aperture and the fastener extends through the fixed rail and into the aperture to fix the memory ramp to the fixed rail.

6. The vehicle seat of claim 4, wherein the a bottom surface of the front portion is recessed with respect to a bottom surface of at least one of the rear portion and the effective portion, wherein the bottom surface of the front portion and a portion of the fixed rail form a gap, wherein the end stop includes a collar and a stop post extending from the collar, wherein the stop bracket is configured to directly contact the stop post and the collar is disposed within the gap.

7. The vehicle seat of claim 1, a stop bracket coupled to and configured to translate with the translatable rail; and an end stop including a stop post, wherein when the translatable rail is disposed in a use position of the one or more use positions the stop bracket directly contacts the stop post, and wherein the stop post and the mechanical effector are collectively configured so that as the mechanical effector moves along the memory ramp in the second direction, the mechanical effector does not contact the stop post of the end stop.

8. The vehicle seat of claim 7, wherein the stop post has a substantially cylindrical body, the cylindrical body including a first transverse wall, a second transverse wall, a front wall, and a rear wall, wherein the first transverse wall and the second transverse wall oppose one another and the front wall and the rear wall each extend between the first transverse wall and the second transverse wall, wherein the first transverse wall has a first length and the front wall has a first width, and wherein the first length is greater than the first width.

9. The vehicle seat of claim 8, a distal end of the mechanical effector is spaced apart from and disposed closer to the first transverse wall than the second transverse wall.

10. The vehicle seat of claim 8, wherein the one or more use positions includes a full rear position, in which the stop bracket directly contacts the front wall of the stop post.

11. A rail assembly for use in a vehicle seat, the vehicle seat including a seat sub-frame, a backrest pivotally connected to the seat sub-frame and configured to pivot towards a seating surface of the seat sub-frame, and an ingress-egress aid coupled to the backrest, the rail assembly comprising:

a fixed rail;

a translatable rail configured to carry the seat sub-frame, wherein the translatable rail includes a first stop member;

a locking device, the locking device configured to be coupled to the ingress-egress aid, wherein the locking device is further configured to operate in a locked state, in which the locking device locks the translatable rail to the fixed rail, and an unlocked state in which the locking device unlocks the translatable rail from the fixed rail to permit translation of the translatable rail in a longitudinal direction along the fixed rail between one or more use positions to an ingress-egress position, wherein the ingress-egress aid is configured to, responsive to the backrest moving towards the seating surface, change the locking device from the locked state to the unlocked state; and a memory bracket fixed to the fixed rail and including a second stop member, wherein when the translatable rail is in a use position of one or more use positions, the first stop member contacts the second stop member, and wherein as the translatable rail moves in the longitudinal direction from the ingress-egress position to the one or more use positions, a portion of the memory bracket engages and displaces a mechanical effector of the ingress-egress aid to permit the backrest to pivot away from the seating surface.

12. The rail assembly of claim 11, wherein the memory bracket includes a rear portion, a front portion, and an effective portion extending between the front and rear portions, wherein the effective portion is the portion that engages and displaces the mechanical effector of the ingress-egress aid, and wherein a height of the memory bracket tapers from the rear portion to the front portion.

13. The rail assembly of claim 12, wherein the front portion defines an aperture and the second stop member includes a stop post and a shank, wherein the stop post extends through the aperture defined by the front portion of the memory bracket and the shank extends through an aperture defined by a base of the fixed rail.

14. The rail assembly of claim 13, wherein an inner periphery of the aperture defines one or more protrusions configured to engage one or more portions of the stop post.

15. The rail assembly of claim 11, wherein the second stop member includes a stop post, and wherein the stop post is integral with the memory bracket.

16. The rail assembly of claim 11, further comprising:

a fastener, wherein the memory bracket includes a rear portion, a front portion, and an effective portion extending between the front and rear portions, wherein the effective portion is the portion that engages and displaces the mechanical effector of the ingress-egress aid, wherein the rear portion defines a fastener aperture and the fastener extends through the fixed rail and into the fastener aperture, and wherein the fastener and the second stop member are substantially aligned with one another with respect to the longitudinal direction.

17. A vehicle seat comprising:

a rail assembly including a fixed rail, a translatable rail, and a locking device, wherein the translatable rail includes a first stop member, wherein the locking device is configured to operate in a locked state, in which the locking device locks the translatable rail to the fixed rail, and an unlocked state in which the locking device unlocks the translatable rail from the fixed rail to permit translation of the translatable rail along the fixed rail;

a seat sub-frame fixed to the translatable rail;

a backrest pivotally connected to the seat sub-frame and configured to pivot towards a seating surface of the seat sub-frame, wherein the translatable rail is configured to carry the seat sub-frame and the backrest;

an ingress-egress aid coupled to the backrest and the locking device, wherein in response to the backrest pivoting towards the seat surface, the ingress-egress aid is configured to change the locking device from the locked state to the unlocked state to permit the translatable rail to move along the fixed rail in a first direction from one or more use positions to an ingress-egress position;

a memory bracket fixed to the fixed rail, wherein the memory bracket forms an inclined plane, wherein a height of the inclined plane increases with respect to a second direction, wherein the second direction is opposite the first direction; and a second stop member coupled to the memory bracket, wherein when the translatable rail is in a use position of the one or more use positions, the first stop member contacts the second stop member, wherein the ingress-egress aid includes a mechanical effector, wherein as the translatable rail moves in the second direction from the ingress-egress position to the one or more use positions, the inclined plane engages and displaces the mechanical effector to permit the backrest to pivot away from the seating surface.

18. The vehicle seat of claim 17, wherein the second stop member is formed by a fastener including a first side, facing the first direction, and a second side facing the second direction, wherein a first surface disposed on the first side is configured to directly contact the first stop member to stop the translatable rail in the use position, wherein the second side includes a second surface and a third surface, wherein the second and third surfaces are spaced apart from one another with respect to a vertical direction and wherein the first, second and third surfaces are collectively configured to transfer a force associated with stopping the translatable rail in the use position to the memory bracket.

19. The vehicle seat of claim 18, wherein the third surface is spaced apart from the second surface with respect to the second direction.

20. The vehicle seat of claim 17, wherein the second stop member includes a collar and a stop post extending from the collar, wherein the memory bracket includes a base configured to lie along a bottom wall of the fixed rail, wherein the base includes a first edge region and a second edge region, and wherein distal end portions of the first and second edge regions are each configured to engage the collar to rotationally fix the memory bracket to the bottom wall of the fixed rail.

* * * * *